United States Patent
Waters et al.

(10) Patent No.: US 7,957,474 B2
(45) Date of Patent: Jun. 7, 2011

(54) ROBUST DETECTION OF PACKET TYPES

(75) Inventors: Deric Wayne Waters, Dallas, TX (US); Srinath Hosur, Plano, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1133 days.

(21) Appl. No.: 11/618,432

(22) Filed: Dec. 29, 2006

(65) Prior Publication Data

US 2007/0253499 A1 Nov. 1, 2007

Related U.S. Application Data

(60) Provisional application No. 60/762,243, filed on Jan. 26, 2006.

(51) Int. Cl.
*H04K 1/10* (2006.01)
(52) U.S. Cl. ..................................................... 375/260
(58) Field of Classification Search .......... 375/260–262, 375/265, 279–281, 329, 332; 370/208, 210
See application file for complete search history.

(56) References Cited

U.S. PATENT DOCUMENTS

| | | | | |
|---|---|---|---|---|
| 7,555,053 | B2 * | 6/2009 | Trachewsky et al. | ......... 375/267 |
| 2004/0064351 | A1 | 4/2004 | Mikurak | |
| 2004/0156309 | A1 | 8/2004 | Chadha et al. | |
| 2004/0215895 | A1 | 10/2004 | Cypher | |
| 2004/0260885 | A1 | 12/2004 | Landin et al. | |
| 2004/0260886 | A1 | 12/2004 | Landin et al. | |
| 2004/0260887 | A1 | 12/2004 | Landin et al. | |
| 2004/0260889 | A1 | 12/2004 | Cypher | |

(Continued)

FOREIGN PATENT DOCUMENTS

WO   WO 2004/017588 A1   2/2004

(Continued)

OTHER PUBLICATIONS

EWC HT PHY Specification, Enhanced Wireless Consortium Publication, http://www.enhancedwirelessconsortium.org/home/EWC_PHY_spec_V127.pdf, Dec. 23, 2005, 67 pgs.

(Continued)

*Primary Examiner* — Young T. Tse
(74) *Attorney, Agent, or Firm* — Steven A. Shaw; W. James Brady; Frederick J. Telecky, Jr.

(57) ABSTRACT

Disclosed herein is a system and method for determining the presence of rotated-BPSK modulation. In addition, disclosed herein is a system and method for determining if a received packet is a Legacy, Mixed-Mode, or Green-Field packet in accordance with the determination of the presence of rotated-BPSK modulation. The presence of a Green-Field packet may be determined by detecting if additional tones are being excited in an LTF symbol of the received packet and/or if a SIG field symbol following the LTF symbol is modulated by rotated-BPSK. The presence of a Mixed-Mode packet may be determined by detecting if the first four bits of the SIG field symbol following the LTF symbol are [1 1 0 1] and/or detecting if a symbol following an L-SIG symbol is modulated by rotated-BPSK. The presence of a Legacy packet may be determined by detecting if the symbol following the L-SIG symbol is modulated by BPSK.

17 Claims, 5 Drawing Sheets

U.S. PATENT DOCUMENTS

| | | |
|---|---|---|
| 2004/0268055 A1 | 12/2004 | Landin et al. |
| 2004/0268056 A1 | 12/2004 | Landin et al. |
| 2004/0268057 A1 | 12/2004 | Landin et al. |
| 2004/0268058 A1 | 12/2004 | Landin et al. |
| 2004/0268059 A1 | 12/2004 | Landin et al. |
| 2005/0005075 A1 | 1/2005 | Landi et al. |
| 2005/0010615 A1 | 1/2005 | Cypher et al. |
| 2005/0013294 A1 | 1/2005 | Cypher |
| 2005/0027947 A1 | 2/2005 | Landin |
| 2005/0044174 A1 | 2/2005 | Landin et al. |
| 2005/0152473 A1 | 7/2005 | Maltsev et al. |
| 2005/0174927 A1 | 8/2005 | Stephens et al. |
| 2005/0180360 A1 | 8/2005 | Hansen et al. |
| 2005/0281322 A1 | 12/2005 | Lee et al. |
| 2006/0182017 A1 | 8/2006 | Hansen et al. |
| 2006/0193340 A1* | 8/2006 | Jones et al. ............ 370/465 |
| 2007/0025392 A1* | 2/2007 | Moorti et al. ........... 370/465 |
| 2007/0058623 A1* | 3/2007 | Moorti et al. ........... 370/389 |
| 2007/0093216 A1* | 4/2007 | Nakao ..................... 455/101 |
| 2008/0049654 A1* | 2/2008 | Otal et al. ............... 370/311 |

FOREIGN PATENT DOCUMENTS

| | | |
|---|---|---|
| WO | WO 2004/092958 A2 | 10/2004 |
| WO | WO 2004/092968 A2 | 10/2004 |
| WO | WO 2004/093408 A2 | 10/2004 |

OTHER PUBLICATIONS

Matthew S. Gast, 802.11 Wireless Networks, The Definitive Guide, http://www.oreilly.com/catalog/802dot112/chapter/ch15.pdf, Second Edition, Apr. 2005, pp. 311-342.

* cited by examiner

ROBUST DETECTION OF PACKET TYPES

CROSS-REFERENCE TO RELATED APPLICATIONS

This application claims priority to U.S. Provisional Application No. 60/762,243, filed Jan. 26, 2006, entitled "Robust Detection of Packet Type for 802.11n Systems", Deric Waters et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Recent development in wireless communication has been focused on multiple-input and multiple-output (MIMO) communication systems. In a MIMO system there are one or more antennas in an array at a transmitter and one or more antennas in an array at a receiver. MIMO systems take advantage of the spatial diversity created by the separation between each antenna in an array in order to improve performance in terms of increased reliability, range, and capacity of data transmission. MIMO systems may enable improved performance by using multiple antennas at a receiver to detect the cumulative effect of a signal and any reflected copies of the signal that traverse multiple paths from a transmitter to the receiver. MIMO systems may also enable improved performance by using multiple antennas at a transmitter to send copies of the same signal from each antenna such that they constructively interfere in a desired direction, referred to as beam forming, to cumulatively provide a stronger signal than any one antenna could transmit to the receiver.

Orthogonal frequency-division multiplexing (OFDM) is a modulation technique that may be used in wireless communication systems to improve spectral efficiency and provide for resistance against multi-path interference. OFDM divides a frequency channel into multiple overlapping orthogonal sub-carriers with data symbols modulated onto each sub-carrier. Since each of the sub-carriers is orthogonal, the peak of each sub-carrier, or a tone, coincides with the nulls of all of the other sub-carriers such that a sub-carrier can be sampled at its strongest point without any interference from the other sub-carriers. By taking advantage of this orthogonality, the entire frequency range of each channel may be used without causing interference to adjacent frequency channels such that guard frequencies, that are used in legacy modulation techniques, do not have to be used with OFDM. Also, since each frequency channel is divided into multiple sub-carriers, each sub-carrier may operate at a low symbol rate. The low symbol rate creates a strong resistance against multi-path and multi-symbol interference.

Taking advantage of both of these recent advances in technology, MIMO communication systems that transmit data using OFDM are now being designed. A standardization process for how these types of wireless systems should communicate is in progress with 802.11n. The goal of the 802.11n standard is to provide faster wireless communication of at least 100 Mbps net throughput that can reliably communicate over greater ranges than the 802.11a/g predecessors, but still supports communication with systems using the legacy standards. A receiver in an 802.11n compliant system may receive several different types of packets corresponding to the legacy standards and the 802.11n standard. Each of the different types of packets may have different formats that may need to be processed differently by the receiver. A need exists for an 802.11n compliant receiver to be able to identify the type of packet that it is receiving in order to enable proper processing of the data contained in the packet.

SUMMARY

Disclosed herein is a method for determining the modulation of a signal. The method includes receiving the signal and multiplying the received signal by the conjugate transpose of an overall channel response for the signal. The result of the multiplication is summed for a set of sub-carriers in the signal. The modulation of the signal is then determined in accordance with a location of the result of the sum in the real-imaginary plane. The signal is then processed in accordance with the determination of the modulation.

Also disclosed herein is a system including at least one transmitter with one or more antennas configured to transmit a packet of data. The system also includes at least one receiver with one or more antennas configured to receive the packet of data. The receiver is configured to determine whether the packet is a Legacy, Mixed-Mode, or Green-Field packet and to process the packet in accordance with the determined type of packet. Further disclosed herein is a receiver including a programmable processor configured to determine whether a received packet is a Legacy, Mixed-Mode, or Green-Field packet and process the packet in accordance with the determination. The determination includes the processor applying a decision function to a SIG field symbol following an LTF symbol of the packet for a subset of all of the sub-carriers in a channel to determine a type of modulation for the SIG field symbol following the LTF symbol. If the type of modulation for the SIG field symbol following the LTF symbol is rotated-BPSK, the processor determines that the packet is a Green-Field packet. If the receiver has prior knowledge that the packet was not a Green-Field packet, the aforementioned step may be omitted. If the packet is not a Green-Field packet, the determination further includes the processor applying a decision function to a symbol following an L-SIG symbol of the packet for a subset of all of the sub-carriers in a channel to determine a type of modulation for the symbol following the L-SIG symbol. If the type of modulation for the symbol following the L-SIG symbol is rotated-BPSK, the processor determines that the packet is a Mixed-Mode packet. If the type of modulation for the symbol following the L-SIG symbol is BPSK, the processor determines that the packet is a Legacy packet.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Disclosed herein is a system and method for determining the modulation of a packet in any general case. More specifically, disclosed herein is a system and method for determining a type of packet that is being received at an 802.11n compliant receiver. An 802.11n compliant receiver may receive any of a Legacy, Mixed-Mode, or Green-Field packet depending on the communication environment it is in. In order to properly process a received packet a determination may be made as to the type of packet that is being received. Since the Legacy and Mixed-Mode packets have a similar preamble and a Green-Field packet is structured in a much different way, then a determination of whether a received packet is a Green-Field packet may first be made. The presence of a Green-Field packet may be determined by detecting if additional tones are being excited in the third and/or fourth OFDM symbol of the received packet and/or if the fifth OFDM symbol is modulated by rotated-BPSK. In some embodiments, the receiver may have prior knowledge that Green-Field packets will not be present. If it has been determined that the received packet is not a Green-Field packet then a determination may be made of whether a received packet is a Mixed-Mode or Legacy packet. The presence of a Mixed-Mode packet may be determined by detecting if the bits in the RATE field of the fifth OFDM symbol are [1 1 0 1] and detecting if the sixth OFDM symbol is modulated by rotated-BPSK. The presence of a Legacy packet may be determined by detecting if the packet is determined to be neither a Green-Field or Mixed-Mode packet in which case none of the OFDM symbols use rotated-BPSK modulation.

Figure 1:
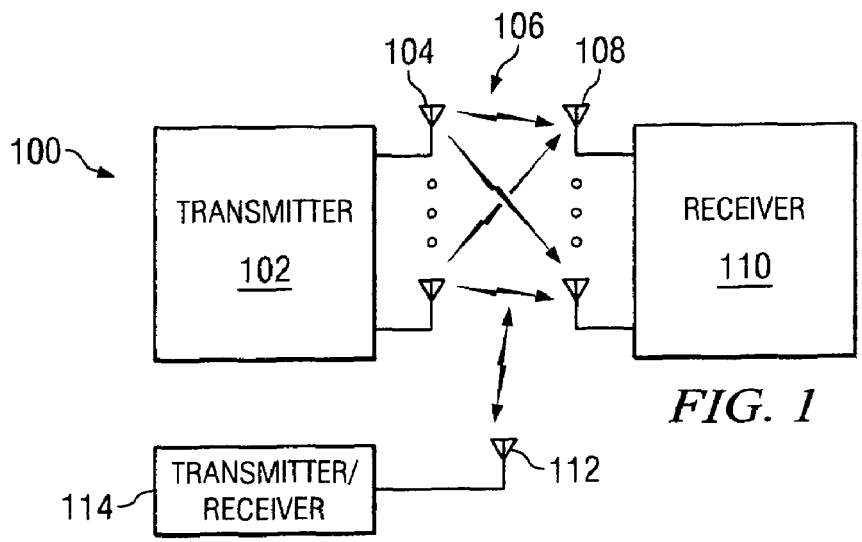
FIG. 1 illustrates an exemplary wireless communication system.

FIG. 1 illustrates an exemplary wireless communication system 100. The communication system 100 includes a multiple-input and multiple-output (MIMO) transmitter 102 and receiver 110 that may communicate via the 802.11n standard. The communication system 100 may also include a legacy transmitter or receiver 114 that may communicate via any of the 802.11a/g standards. The legacy transmitter or receiver 114 has a single antenna 112, whereas the transmitter 102 includes one or more transmitter antennas 104 and the receiver 110 includes one or more receiver antennas 108. Each of the transmitter 102, the receiver 110, and the legacy transmitter or receiver 114 may be implemented as a general purpose computer or using one or more application-specific integrated circuits (ASICs). A detailed description of general purpose computing and some ASICs is detailed below.

The signals 106 transmitted by each transmitter antenna 104 may traverse the communication medium via different paths to be received by each of the one or more receiver antennas 108. For example, the transmitter antenna 104 illustrated at the top of the transmitter 102 transmits a signal that traverses different paths to be received by both of the illustrated receiver antennas 108. The combination of paths that each signal 106 travels over the communication medium is referred to as the channel, where the impact that the communication medium has on the signal is referred to as the channel response or the channel gain. The channel response may also include the effects of the transmitter and receiver hardware on the signal. In general, the signal that is received at the receiver 110 on one subcarrier may be expressed in the frequency domain as:

$$r = Hqd + n,$$

where r is the vector representing the signal received by all of the receiver antennas 108, q implements some signal conditioning that maps one data symbol onto the ensemble of one or more transmit antennas 104, d is the data signal to be communicated to the receiver 110, n is the noise vector that represents the noise detected by each of the receiver antennas 108, and H is a matrix that models the channel response on one subcarrier. The matrix H has one column for each antenna 104 used by the transmitter 102, and one row for each antenna 108 used by the receiver 110. It is convenient to combine all the effects on the signal into an overall channel response h=Hq, so that the signal received by the receiver may be expressed as:

$$r = hd + n$$

While depicted as unidirectional communication devices, each of the transmitter 102 and receiver 110 may be bi-directional communication devices such as a transceiver. Also, while only one MIMO transmitter 102 and receiver 110 and one legacy transmitter or receiver 114 are depicted, a plurality of each of the devices may be present in the communication system 100.

In an 802.11n communication system 100 there may be a plurality of types of packets that can be received by the receiver 110 depending on whether legacy communication components are present. As shown in FIG. 2, the receiver 110 may receive any of three kinds of packets referred to as Legacy, Mixed-Mode, and Green-Field packets described in more detail below. The 802.11n receiver 110 must make a decision about what kind of packet has arrived since different types of packets may be processed differently.

Figure 2A:
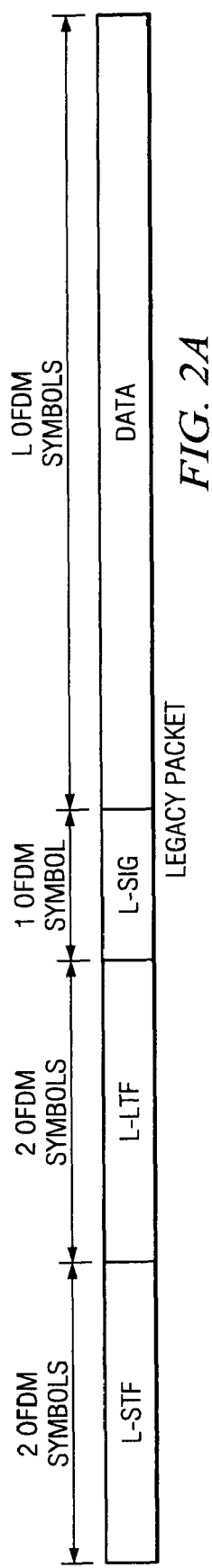
FIG. 2A illustrates an exemplary packet structure for a Legacy packet.
Figure 2B:
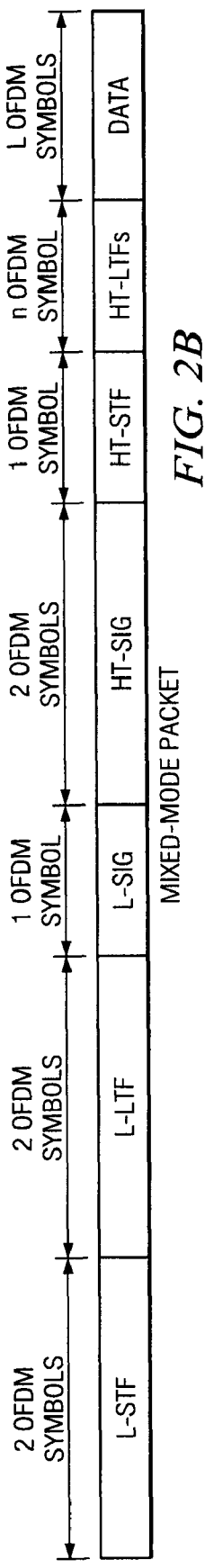
FIG. 2B illustrates an exemplary packet structure for a Mixed-Mode packet.
Figure 2C:
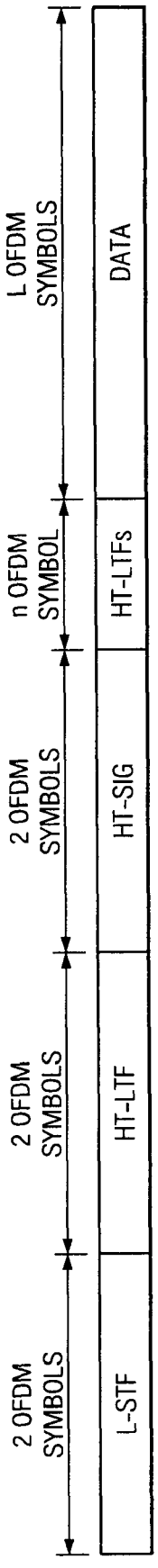
FIG. 2C illustrates an exemplary packet structure for a Green-Field packet.

FIGS. 2A-2C illustrates the structures of the different packet types. FIG. 2A illustrates the Legacy packet that may be used in 802.11a/g communications. A Legacy packet may also be referred to as a non-high throughput (non-HT) packet. As shown in FIG. 2A, the Legacy packet includes two OFDM symbols of legacy short training fields (L-STF), two OFDM symbols of legacy long training fields (L-LTF), a legacy signal (L-SIG) OFDM symbol, and a number L data OFDM symbols. The L-STF symbols may be used to train the automatic gain control (AGC) of the receiver 110 as well as generate rough estimates of the carrier frequency and the channel response, and the L-LTF symbols may be used to fine-tune the frequency and channel response estimates. The L-SIG symbol provides information on the rate and length of the data that is being transmitted.

Similar to the Legacy packet, the Mixed-Mode packet illustrated in FIG. 2B includes the L-STF, L-LTF, and L-SIG fields. The Mixed-Mode packet enables a mixed communication environment similar to that depicted in FIG. 1 with both 802.11a/g devices and 802.11n devices. The legacy devices have the ability to decode the L-STF, L-LTF, and L-SIG fields and determine that the packet should not be decoded by the legacy device. An 802.11n compliant receiver 110 may receive and decode this packet to enable a high throughput (HT) exchange of data with an 802.11n compliant transmitter 102. The Mixed-Mode packet also includes two OFDM symbols of HT-SIG field, a HT-STF OFDM symbol, n OFDM symbols of HT-LTF, and a number L data OFDM symbols. The HT-SIG field similarly provides information on the rate and length of the data that is being transmitted as well as additional information such as the number of HT-LTFs, whether aggregation is being used, and if there are 20 MHz channels or 40 MHz channels. The HT-STF may be used to improve the AGC for MIMO systems and the HT-LTFs may be used for fine-tuning and/or recomputing the frequency and channel estimates for each of the receive chains as is known to those skilled in the art.

In FIG. 2C the structure of the Green-Field packet is illustrated. The Green-Field packet structure is such that not all devices can understand them. The transmitter 102 and the receiver 110 of FIG. 1 may be configured such that communication with Green-Field packets may be optional. Similar to both the Legacy and Mixed-Mode packets, the Green-Field packet has a L-STF. In the Green-Field packet, instead of the next two OFDM symbols being L-LTF symbols, two HT-LTF symbols are used. The HT-LTF and L-LTF OFDM symbols are very similar, except that the HT-LTF symbol excites additional sub-carriers as is known to those skilled in the art. Since these symbols are so similar, the receiver 110 may perform the calculation of the channel response for the HT-LTF and L-LTF in a similar manner except the HT-LTF includes a channel response calculation for the additional sub-carriers.

In order to differentiate between which type of packet is being received, since the Mixed-Mode and Legacy packets are so similar, it may first be determined whether a packet is a Green-Field packet or not. As seen in FIGS. 2A-2C, all three types of packets begin with two OFDM symbols for the L-STF and either two L-LTF or two HT-LTF symbols that are very similar to each other as described above.

Figure 3A:
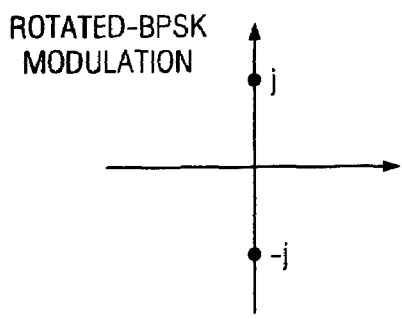
FIG. 3A illustrates an exemplary rotated-BPSK modulation constellation.
Figure 3B:
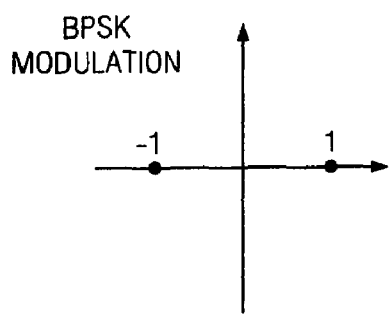
FIG. 3B illustrates an exemplary BPSK modulation constellation.

In one embodiment, the determination of whether or not a Green-Field packet is received may be accomplished by detecting how the data in the fifth OFDM symbol is modulated. For Green-Field packets, the fifth OFDM symbol is the first half of the HT-SIG field and the data in this symbol is modulated using rotated binary phase-shift keying (rotated-BPSK). On the other hand, the fifth OFDM symbol in both a Mixed-Mode and Legacy packet is the L-SIG field, which has data modulated using conventional BPSK. Phase-shift keying (PSK) is a digital modulation scheme that uses a finite number of phases to uniquely represent distinct signals. In BPSK only two phases are used that are separated by 180° phase shift to represent a binary "0" or a binary "1", for example. FIG. 3A illustrates the modulation constellation for rotated-BPSK modulation and FIG. 3B shows the modulation constellation for conventional BPSK modulation. As shown by the modulation constellation in FIG. 3A, a rotated-BPSK constellation is aligned to the quadrature axis and as such transmits nothing in the real dimension. As shown by the modulation constellation in FIG. 3B, a BPSK constellation is aligned to the real axis and as such transmits nothing in the imaginary dimension. Therefore, in order to detect if the fifth OFDM symbol in a received packet is a HT-SIG or a L-SIG, and consequently whether or not the packet is a Green-Field packet, the receiver 110 may detect which modulation constellation is used for the data in the fifth OFDM symbol.

In order to determine if the data in the fifth OFDM symbol is modulated using BPSK or rotated-BPSK the signal received by the receiver 110 may be examined. The signal received for the k-th sub-carrier during the l-th OFDM symbol may be expressed as:

$$r_{k,l} = h_k d_{k,l} + n_{k,l},$$

where $r_{k,l}$ is the received signal, $h_k$ is the overall channel response, $d_{k,l}$ is the data, and $n_{k,l}$ is additive noise collected by the receiver antennas 108. As used herein, the use of a lower-case "k" refers to a general designation of a sub-carrier, whereas the use of a number, such as 1 or 2, or a capital "T" refers to a specific designation of a sub-carrier. Also, the use of lower-case "l" refers to a general designation of the OFDM symbol, whereas the use of a number, such as 1 or 2 refers to a specific designation of an OFDM symbol. For example, $d_{2,5}$ refers to the transmitted data of the fifth OFDM symbol on the second sub-carrier. The number of elements in each of the vectors $r_{k,l}$, $h_k$, and $n_{k,l}$ is equal to the number of receive chains at the receiver 110. When detecting the presence of a Green-Field packet in this embodiment l=5 corresponding to the fifth OFDM symbol. In terms of the above channel equation, the fifth OFDM symbol of the incoming packet is an HT-SIG field if $$\angle d_{k,5} \in \left\{\pm \frac{\pi}{2}\right\},$$

that is the phase of the transmitted data of the fifth OFDM symbol on any sub-carrier is equal to either π/2 or −π/2, which would mean that this is a Green-Field packet. Otherwise, if $\angle d_{k,5} \in \{\pi, 0\}$, that is the phase of the transmitted data of the fifth OFDM symbol on any sub-carrier is equal to either π or 0, then the fifth OFDM symbol is an L-SIG OFDM symbol, which would mean the packet is either a Mixed-Mode or Legacy packet.

Figure 6:
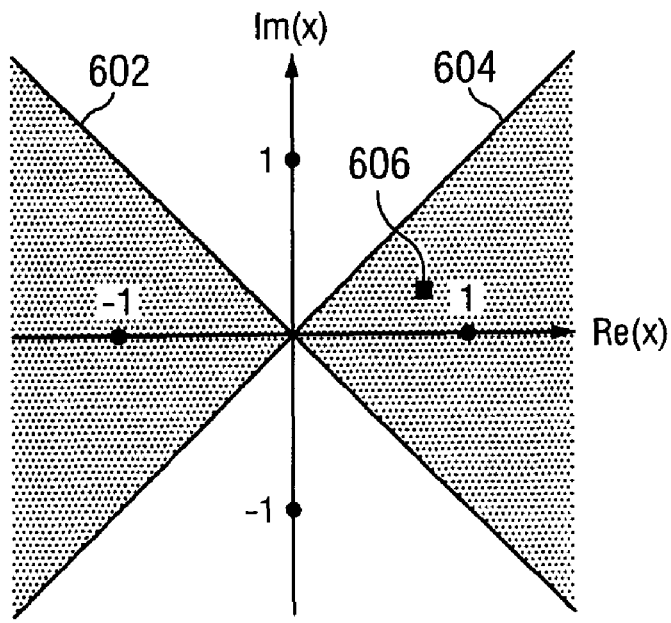
FIG. 6 illustrates exemplary rotated-BPSK and BPSK modulation boundary lines.

The description above has been directed to detecting the presence of rotated-BPSK modulation and how the detection may be used in an 802.11n system. Below is described a technique that may be used to detect the presence of rotated-BPSK modulation in any general case. In preparation for detecting the presence of rotated-BPSK modulation, the receiver 110 may multiply the received signal on each sub-carrier by the conjugate transpose of that sub-carrier's overall channel response. Multiplying the received signal by the conjugate transpose of the sub-carrier's overall channel response for the k-th sub-carrier during the l-th OFDM symbol may be expressed as:

$$y_{k,l} = h_k^* A_k r_{k,l}$$
$$= h_k^* A_k h_k d_{k,l} + h_k^* A_k n_{k,l}$$
$$= (h_k^* A_k h_k) d_{k,l} + \tilde{n}_{k,l},$$

where $$A_k = \begin{bmatrix} \alpha_1 & 0 & \cdots & 0 \\ 0 & \alpha_2 & 0 & \vdots \\ \vdots & 0 & \ddots & 0 \\ 0 & \cdots & 0 & \alpha_M \end{bmatrix}$$

is a diagonal matrix that may be used to scale the received signals from each antenna and each sub-carrier differently. The matrix $A_k$ may be useful when the RF chains and/or sub-carriers have different noise variances. The receiver makes a decision about the presence of rotated-BPSK modulation from the set of measurements $\{y_{k,l}\}$. In general this decision is made according to where one or more of the measurements in the set $\{y_{k,l}\}$ lie in the real-imaginary plane. FIG. 6 shows an example of how boundary lines 602 and 604 may be drawn to separate BPSK and rotated-BPSK modulations. If measurements in the set $\{y_{k,l}\}$ lie within the shaded area, then they are determined to be BPSK modulated. If measurements in the set $\{y_{k,l}\}$ are outside the shaded area, then they are determined to be rotated-BPSK modulated. There are many functions that can discriminate between different modulation schemes by drawing such boundaries, and deciding which region the data most likely came from. For example, if the receiver is deciding between BPSK and rotated-BPSK and $|Im(y_{k,l})|>|Re(y_{k,l})|$, then rotated-BPSK modulation is more likely for $d_{k,l}$. Using this discriminator, the example value shown in FIG. 6 with the square 606 indicates that a BPSK modulation was used. Other discriminators may also be used, for example, the arctangent of $Im(y_{k,l})/Re(y_{k,l})$, $|Im(y_{k,l})|^n - |Re(y_{k,l})|^n$, or $|Re(y_{k,l})|^n - |Im(y_{k,l})|^n$. In the following, an algorithm is described that detects the rotated-BPSK modulation in more detail assuming that the discriminator $|Im(y_{k,l})| - |Re(y_{k,l})|$ is used. The boundaries 602 and 604 for the discriminator can also be different than those shown in FIG. 6. In the following it is assumed that the boundaries 602 and 604 are straight lines that pass through the origin.

For conventional BPSK modulation, the expected value of subtracting the magnitude of the real portion of $y_{k,l}$ from the magnitude of the imaginary portion of $y_{k,l}$ is $-h_k^* A_k h_k$, or:

$$E[|Im(y_{k,l})| - |Re(y_{k,l})|] = -h_k^* A_k h_k.$$

For rotated-BPSK modulation, the expected value of subtracting the magnitude of the real portion of $y_{k,l}$ from the magnitude of the imaginary portion of $y_{k,l}$ is $h_k^* A_k h_k$, or:

$$E[|Im(y_{k,l})| - |Re(y_{k,l})|] = h_k^* A_k h_k.$$

The receiver 110 may exploit this difference to detect which modulation is used and consequently the type of packet received. The decision rule for detecting the type of modulation for data in a symbol is given below.

Rule 1: The data d in a symbol l is modulated with a rotated-BPSK constellation on a sub-carrier k, $$\angle d_{k,l} \in \left\{ \pm \frac{\pi}{2} \right\},$$

if $$f\{x\} > \beta.$$

In this rule, $\beta$ is set in accordance with the types of possible modulations. In the case of detecting between rotated-BPSK modulation and BPSK modulation a preferred value of $\beta$ is zero, but bias may be introduced if desired by setting $\beta$ to a non-zero value. The decision function $f\{x\}$ can be defined in many ways. Below are some specific examples of decision functions:

1. Summation:

$$f\{x\} = \sum_{k \in S} x_k,$$

where S is a subset of $\{1, 2, \ldots, T\}$ containing $L_s$ elements, and $x_k$ may be any discriminator such as $x_k = |Im(y_{k,l})| - |Re(y_{k,l})|$. Other discriminators may include the arctangent of $Im(y_{k,l})/Re(y_{k,l})$, $|Im(y_{k,l})|^n - |Re(y_{k,l})|^n$, or $|Re(y_{k,l})|^n - |Im(y_{k,l})|^n$, for example. If the result of the sum is greater than 8 then the data is modulated with a rotated-BPSK constellation. If the result of the sum is less than 8 then the data is modulated with a BPSK constellation.

2. Majority Vote: $f\{x\} = P - N$, where P is the number of positive elements in the set S as defined above, and N is the number of negative elements in the set S as defined above. Mathematically, P is the number of elements in the set $\{x_k | k \in S \text{ and } x_k > 0\}$, and N is the number of elements in the set $\{x_k | k \in S \text{ and } x_k < 0\}$, where $x_k$ may be any discriminator such as $x_k = |Im(y_{k,l})| - |Re(y_{k,l})|$ for a particular symbol, l. If the result of the difference is greater than $\beta$ then the data is modulated with a rotated-BPSK constellation. If the result of the difference is less than $\beta$ then the data is modulated with a BPSK constellation.

There are many ways to define the set S to be used with either decision function. The performance and complexity of implementing Rule 1 on the receiver 110 depends on the definition of the set S. The complexity of implementing Rule 1 increases linearly with the size of S. Also, the probability that Rule 1 correctly detects the type of modulation for received data also increases with the size of S. Therefore, the goal of the receiver 110 is to strike a balance between performance and complexity in choosing how many and which sub-carriers to include in S.

One guideline to follow in defining these quantities is to ensure that the sub-carriers included in S provide frequency diversity. The frequency diversity may be obtained by choosing the indices in S to be appropriately scattered across the sub-carrier frequencies. One way to appropriately scatter the indices in S is by dividing the T tones into L groups. The set of indices included in the l-th group is designated $P_l$. The grouping of the sub-carriers into the L groups can be done in any way. The simplest solution is to evenly assign the number of tones in each group. In this case, the number of tones in each group, X, would be equal to T/L where the first X tones are assigned to the first group, the next X tones are assigned to the second group, and so on until the final X tones are assigned to the L-th group.

After dividing the sub-carriers into L groups, Rule 1 may be implemented in two stages. In the first stage, the best sub-carriers from each of the L groups are decided. This set of winning sub-carriers is labeled P. Then, in the second stage, the set S is defined as the best sub-carriers from the set P. The set of winning sub-carriers from the L groups is defined as the set of all indices k that satisfy the following conditions:

$$P = \{k | g(a_k, b_k, c_k) \leq \alpha_k \text{ and } k \in P_l \text{ and } l \in \{1, 2, \ldots, L\}\};$$

The subscript k indicates that the parameters $a_k$, $b_k$, $c_k$, and $\alpha_k$ may be different for each sub-carrier, and the subscript l indicates that each group may use a different metric or set of parameters to decide its winners. Once the first group of winners is established, the set of indices used to implement Rule 1 is defined in a similar manner as:

$$S=\{k|g(a_k,b_k,c_k)\leq \alpha_k \text{ and } k\epsilon P\}$$

Once again the subscript k indicates dependence on the sub-carrier.

The winning sub-carriers, or best sub-carriers, from a given set are those for which the following test is true:

$$g(a_k,b_k,c_k)=(a_k-b_k)/c_k \leq \alpha_k.$$

The parameters $a_k$, $b_k$, $c_k$, and $\alpha_k$ can be defined in many ways, and provide flexibility in adapting Rule 1 to achieve the appropriate performance complexity trade-off. Some examples of parameter definitions are given in the following tables.

TABLE 1

Example metrics for the k-th sub-carrier $g(a_k, b_k, c_k)$

| $a_k$ | $b_k$ | $c_k$ | Description |
|---|---|---|---|
| $|x_k|$ | $h_k^* A_k h_k$ | $h_k^* A_k h_k \sigma_k$ | The reliability of the data based on the log-likelihood ratio. |
| $\|h_k\|^2/\sigma_k^2$ | 0 | 1 | The effective SNR of the sub-carrier. |
| a | 0 | 1 | Constant. |
| $|x_k|$ | $\text{mean}_{i=1\ldots T}(|x_k|)$ | 1 | Distance from the mean. |

Table 1: Example Metrics for the k-th Sub-carrier $g(a_k,b_k,c_k)$

TABLE 2

Example thresholds for the k-th sub-carrier $\alpha_k$

| $\alpha_k$ | Description |
|---|---|
| $\alpha_k = g(a_i, b_i, c_i)$, where $g(a_i, b_i, c_i) > g(a_j, b_j, c_j)$ is true for at least K values of j, and $0 \leq K \leq T$. | Consider K sub-carriers with the largest metric. |
| $\alpha_k = g(a_i, b_i, c_i)$, where $g(a_j, b_j, c_j) > g(a_i, b_i, c_i)$ is true for at least K values of j, and $0 \leq K \leq T$. | Consider K sub-carriers with the smallest metric. |

As shown in table 1, the first two rows describe parameter combinations that provide different aspects of a measure of the signal-to-noise ratio (SNR) of the signal received on each sub-carrier, k. The parameters of the first row are chosen such that $g(a_k,b_k,c_k)$ describes the SNR of each sub-carrier in terms of a normalized magnitude of the noise present on each sub-carrier. The parameters of the second row are chosen such that $g(a_k,b_k,c_k)$ describes the effective SNR of each sub-carrier. As shown in table 2, the first row indicates that the K sub-carriers with the largest solutions to $g(a_k,b_k,c_k)$ are chosen to be the winning sub-carriers and the second row indicates that the K sub-carriers with the smallest solutions to $g(a_k,b_k,c_k)$ are chosen to be the winning sub-carriers. As such, when combining the possible parameters between the first two rows of table 1 and table 2, the winning sub-carriers in a set may be the K sub-carriers with the largest or smallest SNR.

The parameters of the third row of table 1 are chosen such that $g(a_k,b_k,c_k)$ is constant for all of the sub-carriers. As shown in the third row of table 1, the value of the parameter $a_k$ may be any constant value "a". In this case, the winning sub-carriers may be chosen from any of the sub-carriers in accordance with the value of the constant "a". For example, the winning sub-carriers may be chosen based on a particular spacing of sub-carriers in a set such as the first K sub-carriers in a set, the last K sub-carriers in a set, every other sub-carrier in a set, or any other desired spacing of k sub-carriers in a set.

The parameters in the fourth row of table 1, are chosen such that the solution of $g(a_k,b_k,c_k)$ describes the distance between the value of the decision function for a particular sub-carrier from the mean value of the decision function. In this case it may be desirable to use $\alpha_k$ as defined in the second row of table 2 so as to choose the winning sub-carriers as the K sub-carriers that are closest to the mean value of the decision function.

The receiver can choose any combination of the parameter and threshold definitions given above in order to adapt Rule 1 to achieve the best performance complexity trade-off. Also note that other definitions of the parameters and threshold are possible as is known to one skilled in the art. For example, if the receiver has knowledge that one or more of the sub-carriers are contaminated by interference the receiver could remove those sub-carriers from consideration in deciding the packet type.

Figure 4:
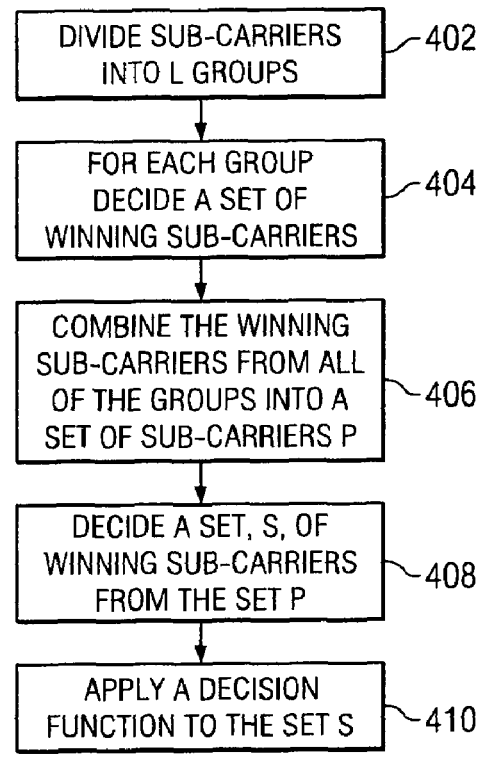
FIG. 4 illustrates an exemplary process for determining the type of modulation of an OFDM symbol in a received packed.

FIG. 4 illustrates an exemplary process for determining the type of modulation of an OFDM symbol in a received packet in accordance with Rule 1. In block 402, the sub-carriers are divided into L groups in any way, such as evenly dividing the number of sub-carriers into each group. In block 404, winning sub-carriers from each of the L groups are decided that satisfy the constraint of $(a_k-b_k)/c_k \leq \alpha_k$ where any combination of the parameters $a_k$, $b_k$, $c_k$, and $\alpha_k$ can be chosen from Table 1 and Table 2. In block 406, the winning sub-carriers from each of the L groups are combined into a set of sub-carriers P. In block 408, winning sub-carriers from the set P are decided that satisfy the constraint of $(a_k-b_k)/c_k \leq \alpha_k$ to generate the set S, where each of the parameters $a_k$, $b_k$, $c_k$, and $\alpha_k$ may be the same or different from the parameters used in block 404. In block 410, a decision is made whether or not a particular OFDM symbol of a received packet is modulated with BPSK or rotated-BPSK based on applying one of the decision functions of Rule 1 to the sub-carriers in the set S.

As mentioned above and shown in FIG. 2C, Green-Field packets contain the first two HT-LTF symbols following the two L-STF OFDM symbols. In contrast, for Mixed-Mode and Legacy packets the two OFDM symbols following the L-STF contain two L-LTF symbols. Therefore, in another embodiment, a Green-Field packet may be differentiated from the Legacy or Mixed-Mode packets if the additional sub-carriers of a HT-LTF symbol are being excited.

In accordance with this embodiment, the receiver 110 may determine if it is receiving a Green-Field packet based on detecting the presence or absence of null tones in the third and fourth OFDM symbols. As mentioned above, Mixed-Mode and Legacy packets do not transmit data on all the sub-carriers that a Green-Field packet does during the LTF symbols. Let N be defined as the set of sub-carriers excited by HT-LTF symbols, but not excited by L-LTF symbols. The receiver 110 can detect if tones in the set N are being excited to decide whether or not the receiver 110 is receiving a Green-Field packet. If this technique is employed, the receiver knows whether or not it is receiving a Green-Field packet after processing the fourth OFDM symbol.

Once again, the receiver compensates for the overall channel response by multiplying the channel output for each sub-carrier by the conjugate transpose of its channel response. In this case, only the third and fourth OFDM symbols are of interest and only a subset of the sub-carriers are of interest. This gives:

$$y_{k,l} = h_k^* A_k h_k d_{k,l} + h_k^* A_k n_{k,l}$$

for the k-th sub-carrier during the l-th OFDM symbol, where $k \in N$ and $l \in \{3,4\}$.

During the LTF OFDM symbols, the transmitter is sending a known sequence, $d_{k,l} \in \{\pm 1\}$, which means the receiver knows what the value of $d_{k,l}$ would be if a Green-Field packet was being transmitted. The receiver 110 may use this information to obtain a statistic for detecting a Green-Field packet. Specifically, $y_{k,l}$ is multiplied by $d_{k,l}$ which gives:

$$d_{k,l} y_{k,l} = p\|h_k\|^2 d_{k,l} \pm h_k^* n_{k,l},$$

where the expected value of $\text{Re}\{d_{k,l} y_{k,l}\}$ is p. If a Green-Field packet is being received then p=1, and if a Mixed-Mode or Legacy packet is being received then p=0. This difference in the expected values of $\text{Re}\{d_{k,l} y_{k,l}\}$ for Mixed-Mode and Legacy packets leads to the decision rule described in Rule 2.

Rule 2: A Green-Field packet is incoming if:

$$f\{[Re(d_3 \cdot y_3), Re(d_4 \cdot y_4)] \cdot [H,H]\} > 0,$$

where the elements of $y_l$, and $d_l$ are the elements in the sets $\{y_{k,l} | k \in N\}$, $\{d_{k,l} | k \in N\}$, respectively, taken in order. The notation [a, b] denotes the concatenation of the vectors a and b. The notation a·b denotes the element-wise multiplications of the vectors a and b. Finally, the elements in the vector H are the elements in the set $\{h_k^* A_k h_k | k \in N\}$ taken in order. As noted above, N is defined as the set of sub-carriers excited by HT-LTF symbols, but not by L-LTF symbols.

The more data points that are available to the receiver to make its decision regarding the packet type, the more likely its decision is to be correct. Therefore, in order to obtain a more robust detection of Green-Field packets, the techniques described in Rule 1 and Rule 2 can be combined to create a new decision rule.

Rule 3: A Green-Field packet is incoming if $$f\{[Re(d_3 \cdot y_3), Re(d_4 \cdot y_4)] \cdot [H,H]\} + f\{|Im(y_l)| - |Re(y_l)|\} > 0.$$

Once a decision has been made that a received packet is not a Green-Field packet, then the receiver 110 may decide if the received packet is either a Mixed-Mode packet or a Legacy packet. The processing for Mixed-Mode and Legacy packets is identical during the first five OFDM symbols of the packet. The sixth OFDM symbol is a HT-SIG field in a Mixed-Mode packet, and a data symbol in a Legacy packet. The HT-SIG field is modulated using a rotated-BPSK constellation while the data portion of the Legacy packet is modulated with BPSK, 4-QAM, 16-QAM, or 64-QAM. If the receiver 110 decodes the L-SIG field in time it can exploit the information from the L-SIG field to help make the decision about the type of packet that is being received. For a Legacy packet, the first four bits of the L-SIG field contain information about how the data is modulated. For a Mixed-Mode packet the first four bits of the L-SIG field are always set to [1 1 0 1]. Therefore, if the receiver 110 decodes something other than [1 1 0 1] for the first four bits of the L-SIG it makes the decision that it has received a Legacy packet. On the other hand, if the first four bits of the decoded L-SIG are [1 1 0 1] or are unknown then the receiver must detect whether the data in the sixth OFDM symbol is modulated with rotated-BPSK or conventional-BPSK. This detection is done by applying Rule 1 to the sixth OFDM symbol, $l \in \{6\}$. If S is chosen appropriately then the expected value of $f\{|Im(y_l)| - |Re(y_l)|\}$ depends on the modulation constellation of the signal, $d_k$, as shown in table 3 using the Rule 1 determination of $f\{|Im(y_l)| - |Re(y_l)|\}$.

TABLE 3

| Expected Values of $f\{|Im(y_l)| - |Re(y_l)|\}$ | | |
|---|---|---|
| E = Expected value of $f\{|Im(y_l)| - |Re(y_l)|\}$ using Majority Vote definition #2. | E = Expected value of $f\{|Im(y_l)| - |Re(y_l)|\}$ using Summation definition #1. | Modulation constellation of $d_k$ |
| \|S\| | $\Sigma_{k \in S} h_k^* A_k h_k$ | Rotated-BPSK |
| −\|S\| | $-\Sigma_{k \in S} h_k^* A_k h_k$ | BPSK |
| 0 | 0 | QAM |

If the first four bits of the L-SIG field are [1 1 0 1], then it is known that the data in the sixth OFDM symbol is modulated with BPSK or rotated-BPSK. In this case, Rule 1 may be applied to the sixth OFDM symbol of the received packet with $\beta=0$ to decide whether the signal $d_k$ is modulated with a rotated-BPSK constellation, and therefore to decide whether the received packet is a Mixed-Mode packet. If the first four bits of the L-SIG field are unknown, then the signal $d_k$ may belong to any of a QAM, BPSK, or rotated-BPSK constellation. In this case, Rule 1 may be applied to the sixth OFDM symbol of the received packet with $\beta=|E|/2$ (E is defined in Table 3) to decide whether the signal $d_k$ is modulated with a rotated-BPSK constellation, and therefore to decide whether the received packet is a Mixed-Mode packet.

Figure 5:
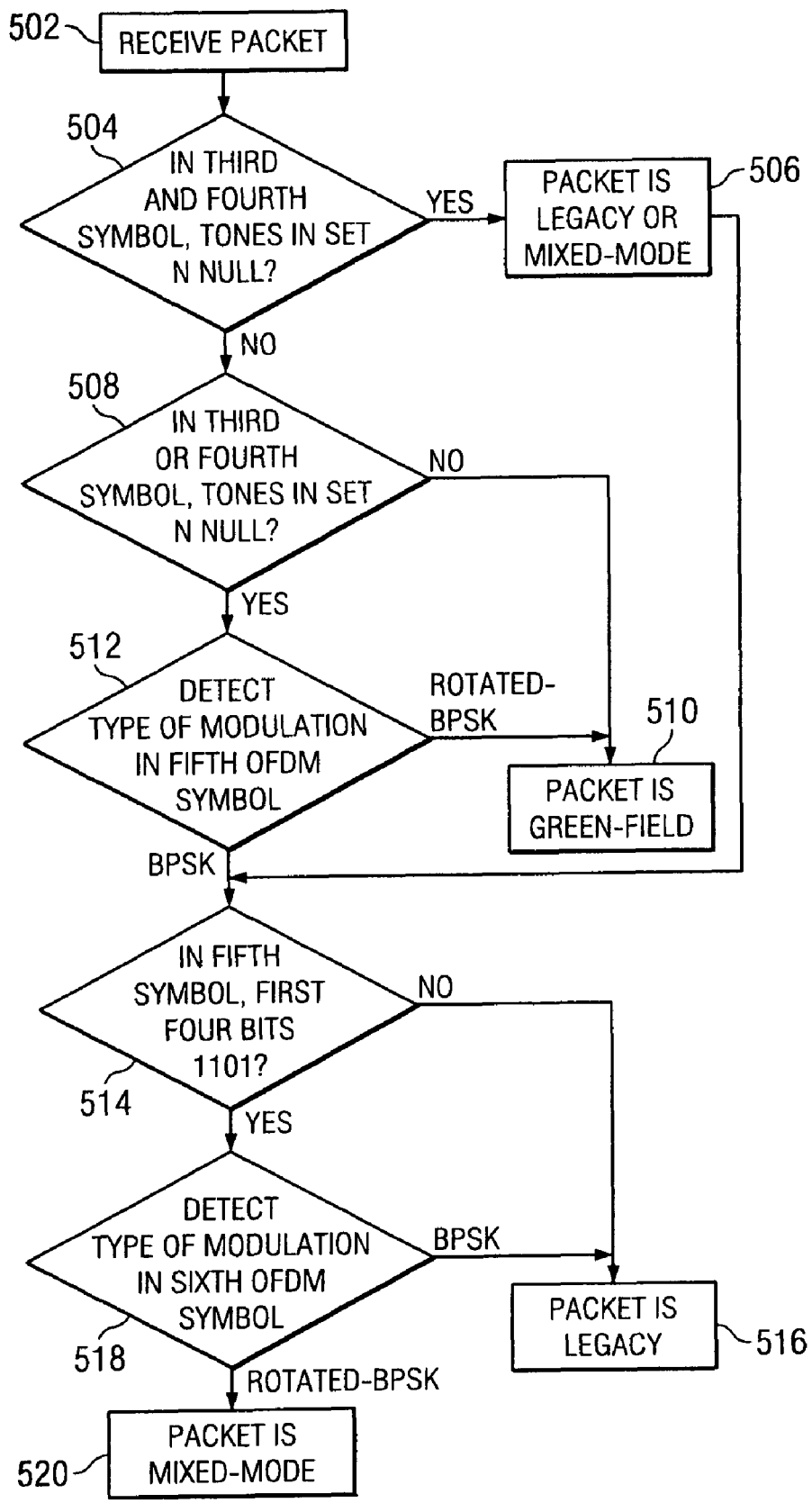
FIG. 5 illustrates an exemplary process for determining the type of packet that is received.

FIG. 5 illustrates an exemplary process that may be implemented by the receiver 110 for deciding the type of packet that is being received. In block 502, a packet is received by the receiver 110. In block 504 the third and fourth OFDM symbols in the packet are examined to determine whether the extra tones in the set N are null in accordance with Rule 2 as described above, where N is the set of sub-carriers excited by HT-LTF symbols, but not by L-LTF symbols. If both of the third and fourth OFDM symbols in the packet have null tones in the set N, then it may be decided that the received packet is either a Legacy or Mixed-Mode packet in block 506. From block 506 the process may proceed to block 514 as described in more detail below. If it is decided in block 504 that in both of the third and fourth OFDM symbols in the packet do not have null tones in the set N, then a decision may be made in block 508 whether the tones in the set N of either the third or the fourth OFDM symbols in the packet are null.

If the tones in the set N of neither of the third or fourth OFDM symbol are null, that is both the third and fourth OFDM symbols have tones excited in the set N, then it may be decided in block 510 that the received packet is a Green-Field packet. On the other hand, if the tones in the set N of one of the third or the fourth OFDM symbol are null then the process may proceed to block 512 for a more robust determination of whether or not the received packet is a Green-Field packet. In block 512, the type of modulation in the fifth OFDM symbol may be determined, for example, in accordance with the process of FIG. 4 described above. If it is determined that the fifth OFDM symbol is rotated-BPSK modulated then in block 510 it is decided that the received packet is a Green-Field packet. If it is determined that the fifth OFDM symbol is BPSK modulated then the process proceeds to block 514.

If the process reaches block 514, then it has been decided that the received packet is not a Green-Field packet and a determination must be made of whether the received packet is a Legacy or Mixed-Mode packet. In block 514 it is determined if the first four bits after decoding the fifth OFDM symbol are [1 1 0 1]. As described above, the first four bits of the fifth OFDM symbol in a Mixed-Mode packet are [1 1 0 1]. As such, if the determination in block 514 is "No", then the received packet is decided to be a Legacy packet in block 516.

If the first four bits of the fifth OFDM symbol are [1 1 0 1] or are unknown, then the process proceeds to block 518. In block 518, the type of modulation in the sixth OFDM symbol may be determined, for example, in accordance with the process of FIG. 4 described above. If it is determined that the sixth OFDM symbol is BPSK modulated, then in block 516 it is decided that the received packet is a Legacy packet. If it is determined that the sixth OFDM symbol is rotated-BPSK modulated, then in block 518 it is decided that the received packet is a Mixed-Mode packet.

As described above, the process illustrated in FIG. 5 of determining the type of received packet is resistant to error due to having at least two different tests before deciding the type of packet. Many modifications or adjustments may be made to this process without departing from the spirit or scope of the disclosure. For example, blocks 504-508 may be removed from the process and the determination of whether or not a received packed is a Green-Field packet may exclusively be made by block 512. Alternatively, blocks 508 and/or 512 may be removed such that the determination of whether or not a received packed is a Green-Field packet may exclusively be made by block 504. In another alternative, block 514 may be removed such that the determination of whether or not a received packed is a Legacy or Mixed-Mode packet may exclusively be made by block 518. It is noted that the alternative processes described above are not an exhaustive list of alternatives and other blocks may be removed or be implemented in a different order. For example, the order of implementing the blocks to detect the type of received packet may be changed in order to improve processing time or processing power required to detect the type of packet. Also, other blocks may be added to provide a more robust determination of the type of packet that is being received. For example, an additional determination of the type of modulation in the sixth OFDM symbol in block 512 or an additional determination of the type of modulation in the seventh OFDM symbol in block 518 may be made in order to provide a more robust determination of the type of modulation.

Disclosed above is a system and method for determining the modulation of a packet. The modulation determination techniques described above may be used to detect the type of modulation for a packet in any general case. The type of modulation of the packet may be used by a receiver to determine if a received packet is a Legacy, Mixed-Mode, or Green-Field packet. The presence of a Green-Field packet may be determined by detecting if additional tones are being excited in the third or fourth OFDM symbol of the received packet and/or if the fifth OFDM symbol is modulated by rotated-BPSK. If it has been determined that the received packet is not a Green-Field packet, then a determination may be made of whether a received packet is a Mixed-Mode or Legacy packet. The presence of a Mixed-Mode packet may be determined by detecting if the sixth and/or seventh OFDM symbols are modulated by rotated-BPSK, and optionally detecting if the first four bits of the fifth OFDM symbol are [1 1 0 1]. The presence of a Legacy packet may be determined by detecting if the sixth and/or seventh OFDM symbols are not modulated by rotated-BPSK. The type of modulation that is used on a particular OFDM symbol is determined using one of a plurality of decision functions on a set of sub-carriers. The set of sub-carriers may be chosen through applying the function $(a_k - b_k)/c_k \leq \alpha_k$ in one or more ways using one or more definitions of the parameters $a_k$, $b_k$, $c_k$, and $\alpha_k$ to balance performance and complexity of detecting the type of modulation.

Figure 7:
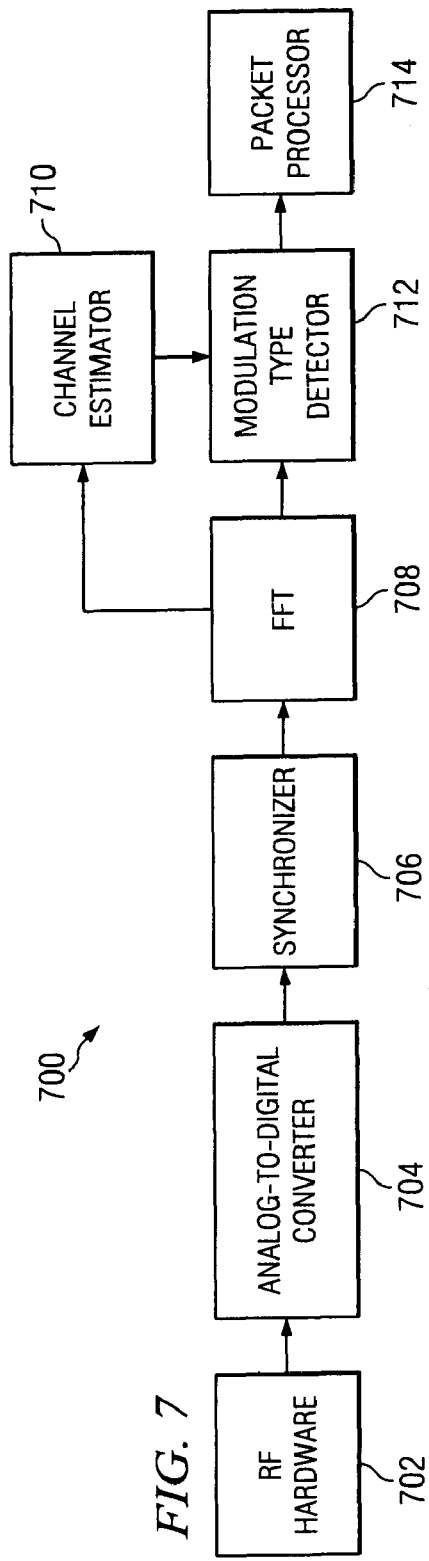
FIG. 7 illustrates an exemplary functional block diagram of a processor for implementing modulation detection.

FIG. 7 illustrates an exemplary functional block diagram of a processor 700 for implementing the modulation detection methods described above. As shown in FIG. 7, the processor 700 includes RF hardware 702, an analog-to-digital (A/D) converter 704, a synchronizer 706, a fast Fourier transform (FFT) 708, a channel estimator 710, a modulation detector 712, and a packet processor 714. The RF hardware 702 may include an antenna, an amplifier and any other signal conditioning hardware necessary for detecting and receiving a signal. The A/D converter 704 digitizes the received signal. The synchronizer 706 detects the preamble of a received packet so as to enable processing of the packet from the start of the packet. The synchronizer 706 may also be used to detect the presence of a packet using the L-STF symbols. The FFT 708 performs a FFT on the digitized and synchronized signal. The channel estimator 710 receives the result of the FFT and uses the LTF symbols to estimate all the effects on the signal from the transmitter 102 to the receiver 110 as the overall channel response. The modulation type detector 712 multiplies the received packet by the conjugate transpose of the overall channel response and sums the result for a set of sub-carriers as described in detail above. The modulation type detector uses the result of the sum for detecting the type of modulation for a received packet. The packet processor 714 processes the packet in accordance with the type of modulation detected.

Figure 8:
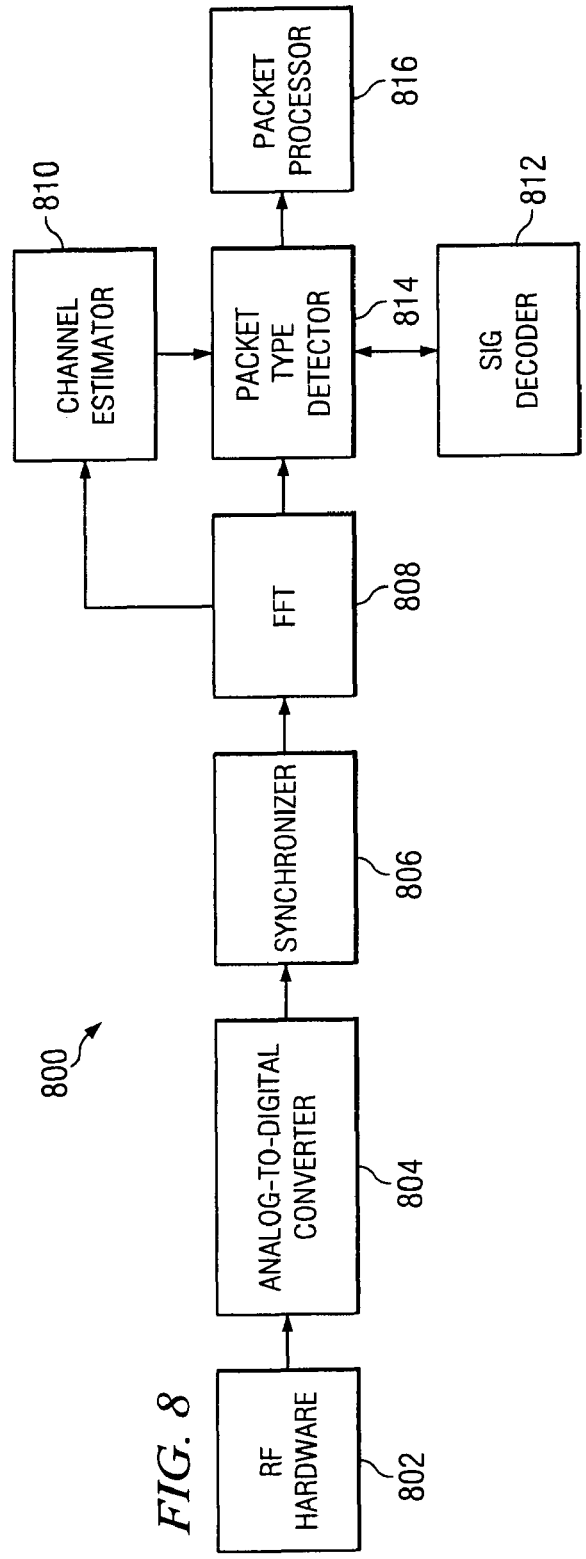
FIG. 8 illustrates an exemplary functional block diagram of a processor for implementing packet-type detection.

FIG. 8 illustrates an exemplary functional block diagram of a processor 800 for implementing the packet detection methods described above. As shown in FIG. 8, the processor 800 includes RF hardware 802, an analog-to-digital (A/D) converter 804, a synchronizer 806, a fast Fourier transform (FFT) 808, a channel estimator 810, a SIG symbol decoder 812, a packet type detector 814, and a packet processor 816. The RF hardware 802, the analog-to-digital (A/D) converter 804, the synchronizer 806, the FFT 808, and the channel estimator 810 operate as described above in conjunction with FIG. 7. The SIG symbol decoder 812 receives the result of multiplying the received packet by the conjugate transpose of the overall channel response from the packet type detector 814. The SIG symbol decoder 812 may then decode and de-interleave the result of the multiplication. As described above, the first four bits of the decoded SIG symbol may be used to detect the presence of a Mixed-Mode packet. The packet type detector 814 performs all of the operations of the modulation type detector 712 described above and uses the results of the modulation type detector 712 to further determine whether the packet is one of a Legacy, Mixed-Mode, or Green-Field packet. The packet processor 816 processes the packet in accordance with they type of packet detected.

The processors described above and illustrated in FIGS. 7 and 8 can be implemented as an ASIC or as part of an ASIC in the receiver 110. The processors may also be implemented as part of a programmable processor or general purpose processor. A discussion of general purpose computing follows. Alternatively, each component or any combination of components may be implemented as an ASIC or as part of an ASIC in the receiver 110.

Figure 9:
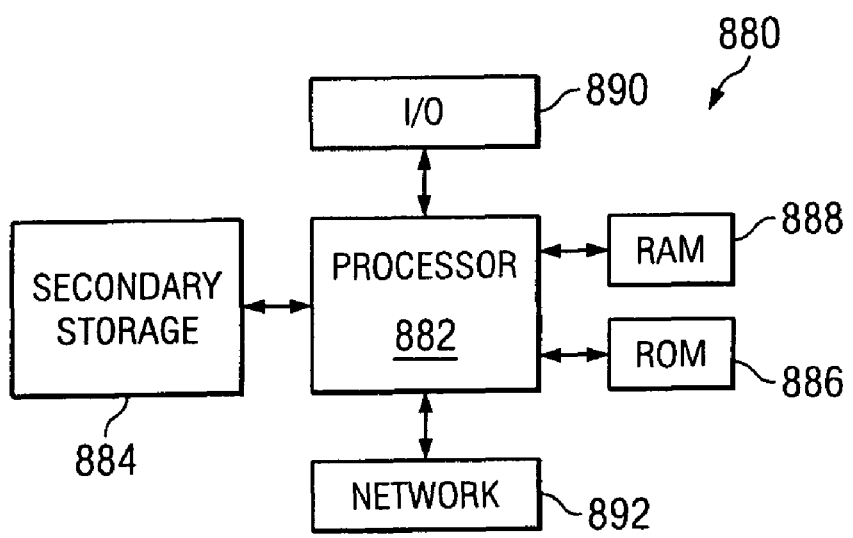
FIG. 9 illustrates an exemplary general purpose computer system suitable for implementing the several embodiments of the disclosure.

Any of the communication components in the communication system 100 described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) 890 devices, and network connectivity devices 892. The processor may be implemented as one or more CPU chips.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. One such program may be for implementing the process or any part of the process of detecting the type of packet that is being received as described above. The ROM 886 is used to store instructions and perhaps data which are read during program execution. ROM 886 is a non-volatile memory device which typically has a small memory capacity relative to the larger memory capacity of secondary storage. The RAM 888 is used to store volatile data and perhaps to store instructions. Access to both ROM 886 and RAM 888 is typically faster than to secondary storage 884.

I/O 890 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 892 devices may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for determining a modulation of an orthogonal frequency-division multiplexing (OFDM) symbol, the method comprising:
   receiving the symbol;
   multiplying the received symbol by the conjugate transpose of an overall channel response for the symbol;
   applying a decision function to the result of the multiplication for a set of sub-carriers, wherein the decision function is to sum the result of the multiplication and the determination is made based on a location of a result of the sum in a real-imaginary plane, wherein the location is determined relative to boundary lines in the real-imaginary plane, where the boundary lines are set in accordance with one of:
   arctangent of $Im(s)/Re(s)$,
   $|Im(s)|^n - |Re(s)|^n$, or
   $|Re(s)|^n - |Im(s)|^n$,
   wherein s is the result of the sum, and n is a variable;
   determining the modulation of the symbol in accordance with the result of the decision function; and
   processing a packet in accordance with the determination of the modulation.

2. The method of claim 1, wherein the modulation is determined to be binary phase shift keying (BPSK) if the location of the result is within the boundary lines and closer to a real axis than an imaginary axis in the real-imaginary plane, and the modulation is determined to be rotated-BPSK if the location of the result is within the boundary lines and closer to the imaginary axis than the real axis in the real-imaginary plane.

3. The method of claim 1, wherein the set of sub-carriers is a subset of all of the sub-carriers in a channel and wherein the set of sub-carriers is determined based on dividing all of the sub-carriers in the channel into a plurality of groups, a first criteria is applied to each group of sub-carriers to produce a first set of sub-carriers that includes all of the sub-carriers that meet the first criteria for all of the groups, and a second criteria is applied to the first set of sub-carriers to produce the set of sub-carriers that includes all of the sub-carriers from the first set of sub-carriers that meet the second criteria.

4. The method of claim 1, further comprising:
   determining whether the packet is a Legacy, Mixed-Mode, or Green-Field packet in accordance with the determination of the modulation of the symbol, wherein the packet includes a plurality of OFDM symbols including the symbol.

5. The method of claim 4, wherein the packet is determined to be the Green-Field packet when the symbol is a high throughput signal (HT-SIG) field symbol following a high throughput long training field (HT-LTF) symbol in the packet and the modulation of the symbol is determined to be rotated-binary phase shift keying (rotated-BPSK).

6. The method of claim 4, wherein the packet is determined to be the Mixed-Mode packet when the symbol follows a legacy signal (L-SIG) field symbol in the packet and the modulation of the symbol is determined to be rotated-binary phase shift keying (rotated-BPSK).

7. The method of claim 4, wherein the packet is determined to be the Legacy packet when the symbol follows a legacy signal (L-SIG) field symbol in the packet and the modulation of the symbol is determined to be binary phase shift keying (BPSK).

8. A method for determining a modulation of an orthogonal frequency-division multiplexing (OFDM) symbol, the method comprising:
receiving the OFDM symbol;
multiplying the received OFDM symbol by the conjugate transpose of an overall channel response for the OFDM symbol;
applying a decision function to the result of the multiplication for a set of sub-carriers, wherein the decision function is:

$\Sigma_{k \in S} x(y_{k,l})$, where $y_{k,l}$ is the result of the multiplication for an l-th symbol that is received on a k-th sub-carrier, S is a subset of sub-carriers, and $x(y_{k,l})$ is one of:
arctangent of $Im(y_{k,l})/Re(y_{k,l})$,
$|Im(y_{k,l})|^n - |Re(y_{k,l})|^n$, or
$|Re(y_{k,l})|^n - |Im(y_{k,l})|^n$,
where n is a variable;
determining the modulation of the OFDM symbol in accordance with the result of the decision function; and
processing a packet in accordance with the determination of the modulation, wherein the type of modulation for the OFDM symbol is rotated-binary phase shift keying (BPSK) if the result of the decision function is greater than $\beta$, and wherein the type of modulation for the OFDM symbol is BPSK if the result of the decision function is less than $\beta$, where $\beta$ is any of $|S|/2$, $-|S|/2$, $(\Sigma_{k \in S} h_k^* A_k h_k)/2$, $-(\Sigma_{k \in S} h_k^* A_k h_k)/2$, or zero and where $h_k$ is the overall channel response, and $A_k$ is a diagonal matrix for scaling the OFDM symbol in accordance with different noise variances on the set of sub-carriers.

9. A method for determining a modulation of an orthogonal frequency-division multiplexing (OFDM) symbol, the method comprising:
receiving the OFDM symbol;
multiplying the received OFDM symbol by the conjugate transpose of an overall channel response for the OFDM symbol;
applying a decision function to the result of the multiplication for a set of sub-carriers, wherein the decision function is:

P−N, where P is the number of elements in the set $\{k | k \in S \text{ and } |x_k| > \beta\}$, N is the number of elements in the set $\{k | k \in S \text{ and } |x_k| < \beta\}$, $\beta$ is any of $|S|/2$, $-|S|/2$, $(\Sigma_{k \in S} h_k^* A_k h_k)/2$, $-(\Sigma_{k \in S} h_k^* A_k h_k)/2$, or zero, where $h_k$ is the overall channel response, $A_k$ is a diagonal matrix for scaling the OFDM symbol in accordance with different noise variances on the set of sub-carriers, S is a subset of sub-carriers, and $x_k$ is one of:
arctangent of $Im(y_{k,l})/Re(y_{k,l})$,
$|Im(y_{k,l})|^n - |Re(y_{k,l})|^n$, or
$|Re(y_{k,l})|^n - |Im(y_{k,l})|^n$,
where $y_{k,l}$ is a result of the multiplication for an l-th symbol that is received on a k-th sub-carrier, and were n is a variable;
determining the modulation of the OFDM symbol in accordance with the result of the decision function; and
processing a packet in accordance with the determination of the modulation, wherein the type of modulation for the OFDM symbol is determined to be rotated-binary phase shift keying (rotated-BPSK) if the result of the decision function is greater than $\beta$, and wherein the type of modulation for the OFDM symbol is determined to be binary phase shift keying (BPSK) if the result of the decision function is less than $\beta$.

10. An apparatus comprising:
a plurality of antennas;
at least one receiver, coupled to the plurality of antennas, configured to receive a packet of data; and
a central processor for determining whether the packet is a Legacy, Mixed-Mode, or Green-Field packet and for processing the packet in accordance with the determined type of packet, wherein the central processor determines whether the packet is the Legacy, Mixed-Mode, or Green-Field packet in accordance with a type of modulation by applying a decision function to a symbol on a subset of sub-carriers in a channel, the decision function is:

$\Sigma_{k \in S} x(y_{k,l})$, where $y_{k,l}$ is a result of multiplying an l-th symbol that is received on a k-th sub-carrier by a conjugate transpose of the k-th sub-carrier's channel response, S is the subset of sub-carriers, and $x(y_{k,l})$ is one of:
arctangent of $Im(y_{k,l})/Re(y_{k,l})$,
$|Im(y_{k,l})|^n - |Re(y_{k,l})|^n$, or
$|Re(y_{k,l})|^n - |Im(y_{k,l})|^n$,
where n is a variable,
wherein the type of modulation for the symbol is rotated-binary phase shift keying (rotated-BPSK) if the result of the decision function is greater than $\beta$, and wherein the type of modulation for the symbol is BPSK if the result of the decision function is less than $\beta$, where $\beta$ is any of $|S|/2$, $-|S|/2$, $(\Sigma_{k \in S} h_k^* A_k h_k)/2$, $-(\Sigma_{k \in S} h_k^* A_k h_k)/2$, or zero and where $h_k$ is the overall channel response, and $A_k$ is a diagonal matrix for scaling the symbol in accordance with different noise variances on the set of sub-carriers.

11. The apparatus of claim 10, wherein the central processor determines the packet is the Green-Field packet by detecting that additional tones are being excited in a high throughput long training field (HT-LTF) symbol of the received packet and/or by detecting that a high throughput signal (HT-SIG) field symbol following the HT-LTF symbol.

12. The apparatus of claim 10, wherein the central processor determines the packet is the Mixed-Mode packet by detecting that the first four decoded bits of a legacy signal (L-SIG) field symbol following a legacy long training field (L-LTF) symbol of the received packet are [1 1 0 1] and/or detecting that a symbol following the L-SIG field symbol of the received packet is a high throughput signal (HT-SIG) field symbol.

13. The apparatus of claim 10, wherein the central processor determines the packet is the Legacy packet by detecting that a symbol following a legacy signal (L-SIG) field symbol of the received packet is not a high throughput signal (HT-SIG) field symbol.

14. A central processor comprising:
a radio frequency RF and signal conditioning portion for receiving a packet;
a synchronizer for detecting a preamble of the received packet;
a fast Fourier transform (FFT) coupled to the synchronizer for performing a FFT transformation;
a channel estimator for receiving results of the FFT transformation;

a packet type detector coupled to FFT and the channel estimator for determining whether the received packet is a Legacy, Mixed-Mode, or Green-Field packet; and a packet processor configured to process the packet in accordance with the determination, the determination comprising:

applying a decision function to a signal (SIG) field symbol following a legacy long training field (L-LTF) symbol of the packet for a subset of all of sub-carriers in a channel to determine a type of modulation for the SIG field symbol following the L-LTF symbol;

determining that the packet is the Green-Field packet if the type of modulation for the SIG field symbol is a high throughput signal (HT-SIG) field symbol following the L-LTF symbol is a high throughput long training field (HT-LTF) symbol and is rotated-binary phase shift keying (rotated-BPSK);

if the packet is not the Green-Field packet, applying the decision function to a symbol following a legacy signal (L-SIG) field symbol of the packet for the subset of all of the sub-carriers in the channel to determine a type of modulation for the symbol following the L-SIG field symbol;

determining that the packet is the Mixed-Mode packet if the type of modulation for the symbol following the L-SIG field symbol is rotated-BPSK; and determining that the packet is the Legacy packet if the type of modulation for the symbol following the L-SIG field symbol is binary phase shift keying (BPSK), wherein the subset of sub-carriers includes sub-carriers from a predefined set of sub-carriers that are equally spaced in frequency or any of the sub-carriers in the channel that meet a criteria $|a-b|/c \geq \alpha$ wherein the parameters a, b, c, and $\alpha$ are chosen to balance performance and complexity of the decision function, wherein the parameters a, b, and c are specified to define one of three metrics for a sub-carrier from the predefined set of sub-carriers:

reliability of a set of data based on log likelihood ratio, effective SNR, or distance to a mean metric across all sub-carriers, wherein the parameter $\alpha$ is specified such that the K sub-carriers with either the largest or smallest metrics comprise the subset, wherein when the parameters use a discriminator, the discriminator is one of:

arctangent of $Im(y_{k,l})/Re(m_{k,l})$, $|Im(y_{k,l})|^n - |Re(y_{k,l})|^n$, or $|Re(y_{k,l})|^n - |Im(y_{k,l})|^n$, where $y_{k,l}$ is a result of multiplying an l-th symbol that is received on a k-th sub-carrier by a conjugate transpose of a channel response of the k-th sub-carrier, and where n is a variable.

15. The central processor of claim 14, further comprising:

a non-transitory computer readable medium having instructions, wherein the central processor is configured to execute the instructions for implementing the determination.

16. A central processor comprising:

a radio frequency RF and signal conditioning portion for receiving a packet;

a synchronizer for detecting a preamble of the received packet;

a fast Fourier transform (FFT) coupled to the synchronizer for performing FFT transformation;

a channel estimator for receiving results of the FFT transformation;

a packet type detector coupled to the FFT and the channel estimator, said packet type detector for determining whether the received packet is a Legacy, Mixed-Mode, or Green-Field packet; and a packet processor configured to process the packet in accordance with the determination, the determination comprising:

applying a decision function to a signal (SIG) field symbol following an legacy long training field (L-LTF) symbol of the packet for a subset of all of sub-carriers in a channel to determine a type of modulation for the SIG field symbol following the L-LTF symbol, wherein the decision function for the SIG field symbol following the L-LTF symbol or the symbol following a legacy signal (L-SIG) field symbol is:

$P - N$, where P is the number of elements in the set $\{k | k \in S$ and $|x_k| > \beta\}$, N is the number of elements in the set $\{k | k \in S$ and $|x_k| < \beta\}$, $\beta$ is any of $|S|/2$, $-|S|/2$, $(\Sigma_{k \in S} h_k^* A_k h_k)/2$, $-(\Sigma_{k \in S} h_k^* A_k h_k)/2$, or zero and where $h_k$ is an overall channel response, $A_k$ is a diagonal matrix for scaling the symbol in accordance with different noise variances on the set of sub-carriers, S is the subset of sub-carriers, and $x_k$ is one of:

arctangent of $Im(y_{k,l})/Re(m_{k,l})$, $|Im(y_{k,l})|^n - |Re(y_{k,l})|^n$, or $|Re(y_{k,l})|^n - |Im(y_{k,l})|^n$, where $y_{k,l}$ is a result of multiplying an l-th symbol that is received on a k-th sub-carrier by a conjugate transpose of a channel response of the k-th sub-carrier, and where n is a variable, wherein the type of modulation for the SIG field symbol following the L-LTF symbol or the symbol following the L-SIG field symbol is determined to be rotated-binary phase shift keying (rotated-BPSK) if the result of the decision function is greater than $\beta$, and wherein the type of modulation for the SIG field symbol following the L-LTF symbol or the symbol following the L-SIG field symbol is determined to be binary phase shift keying (BPSK) if the result of the decision function is less than $\beta$;

determining that the packet is the Green-Field packet if the type of modulation for the SIG field symbol is a high throughput signal (HT-SIG) field symbol following the L-LTF symbol is a high throughput long training field (HT-LTF) symbol and is rotated-BPSK;

if the packet is not the Green-Field packet, applying the decision function to a symbol following a legacy signal (L-SIG) field symbol of the packet for the subset of all of the sub-carriers in the channel to determine a type of modulation for the symbol following the L-SIG field symbol;

determining that the packet is the Mixed-Mode packet if the type of modulation for the symbol following the L-SIG field symbol is rotated-BPSK; and determining that the packet is the Legacy packet if the type of modulation for the symbol following the L-SIG field symbol is BPSK.

17. The central processor of claim 16, further comprising:

a non-transitory computer readable medium having instructions, wherein the central processor is configured to execute the instructions for implementing the determination.

* * * * *